H. PASSIG.
FLY TRAP.
APPLICATION FILED FEB. 24, 1911.

1,020,052.

Patented Mar. 12, 1912.

2 SHEETS—SHEET 1.

Witnesses:
Geo. Knutson
E. C. Steinkle

Inventor:
Hans Passig
By his Attorneys.
Williamson & Merchant

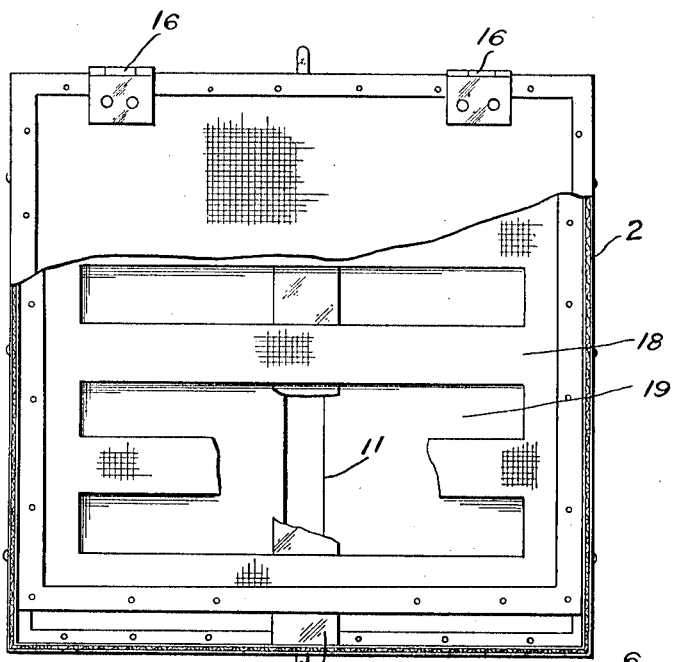
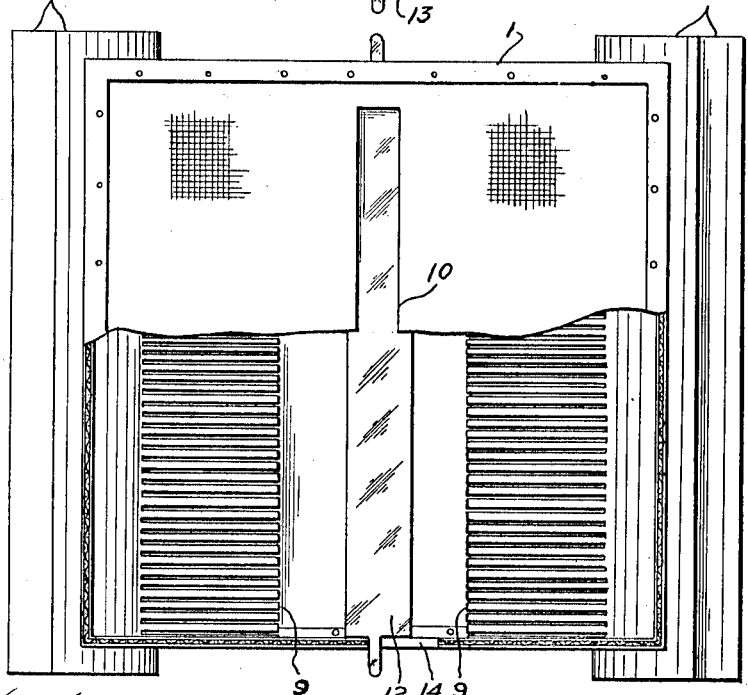

UNITED STATES PATENT OFFICE.

HANS PASSIG, OF LAKE BENTON, MINNESOTA.

FLY-TRAP.

1,020,052. Specification of Letters Patent. Patented Mar. 12, 1912.

Application filed February 24, 1911. Serial No. 610,564.

*To all whom it may concern:*

Be it known that I, HANS PASSIG, a citizen of the United States, residing at Lake Benton, in the county of Lincoln and State of Minnesota, have invented certain new and useful Improvements in Fly-Traps; and I do hereby declare the following to be a full, clear, and exact description of the invention, such as will enable others skilled in the art to which it appertains to make and use the same.

My invention has for its object to provide an improved trap especially adapted for catching flies, and to this end the invention consists of the novel devices and combination of devices hereinafter described and defined in the claims.

The invention is illustrated in the accompanying drawings wherein like characters indicate like parts throughout the several views.

Figure 2:
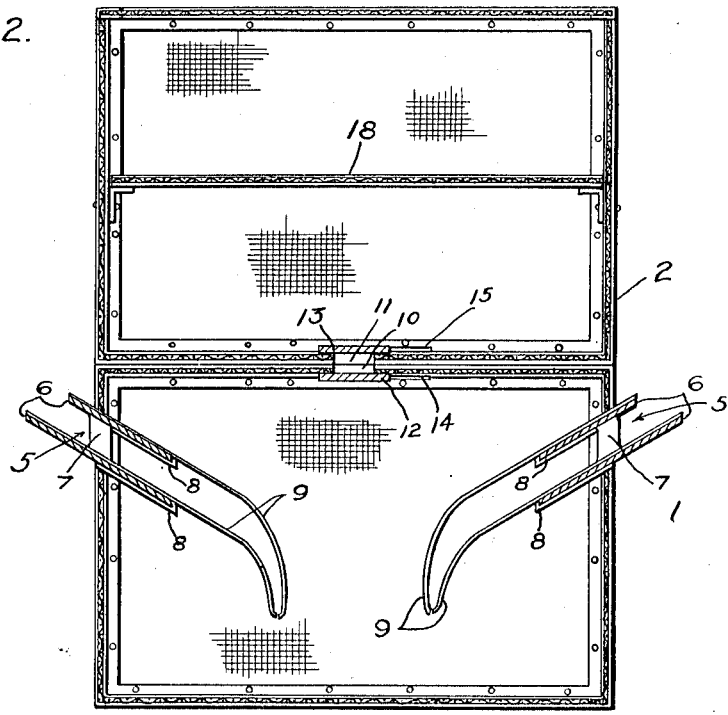
Figure 1:
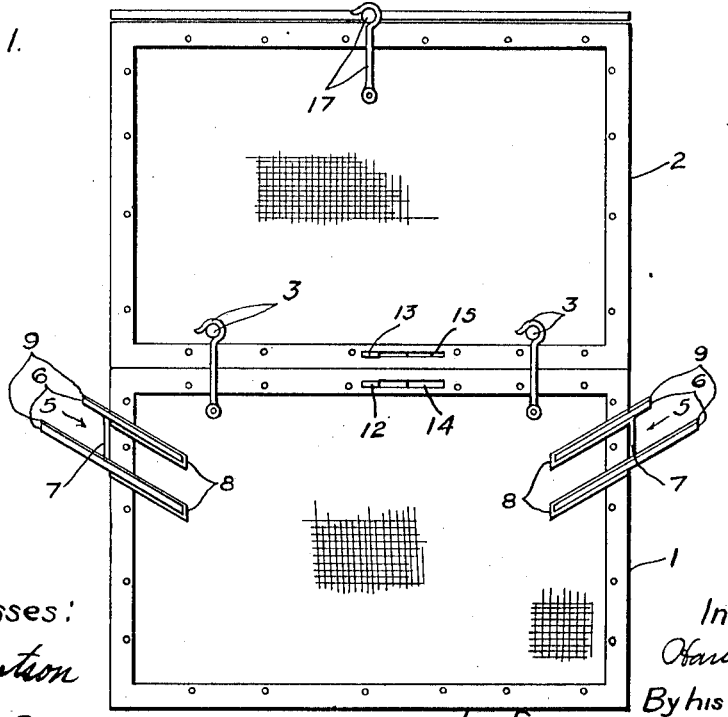

Referring to the drawings, Figure 1 is a view of the improved trap in side elevation; Fig. 2 is a transverse vertical section taken centrally through the same; Fig. 3 is a plan view of the top section of the improved trap with some parts shown in section and other parts broken away; and Fig. 4 is a plan view of the bottom section of the improved trap with some parts shown in section and other parts broken away.

The improved trap is, as shown, preferably constructed in two independent cage sections indicated by the numerals 1 and 2. These cage sections 1 and 2 are normally placed, one upon the other, and detachably secured together by means of hooks and pins 3. Each of the cage sections 1 and 2 is, as shown, preferably formed by means of thin marginal angle strips having rigidly secured thereto, top, bottom and side forming panels of woven wire screen. The lower cage section 1 is provided on opposite sides with a pair of narrow and horizontally extended entrance passages 5 which extend the full width of the cage section 1. Within each entrance passage 5 is detachably mounted a pair of connected plates 6, spaced one above the other, by means of spacing blocks 7. The ends of these plates 6 extend slightly beyond the sides of the cage section 1 and are detachably seated in parallel inwardly and downwardly extended open seats 8 formed in the sides of the cage section 1. The plates 6 extend both inside and outside of the cage section 1 and the lower plate thereof, at its outer portion, is somewhat wider than the upper plate to afford a convenient place for the flies to light upon. To prevent the flies from escaping from the cage section 1 after they have once entered the same, each entrance passage 4 is normally closed against exit by means of a pair of thin brushes 9, preferably formed of sheet rubber secured to the inner longitudinally extended edges of the plates 6, with their lower inner edges arranged to entirely close the entrance passage. The brushes are formed by slitting the free edges of the rubber sheets. As is evident, as a fly passes through the passage 5 and onto the lower brush 9, the same will yield sufficiently to permit the fly to pass between the free edges of the brushes 9 and into the cage section 1. As soon as the fly has passed through the brushes 9, the same will again close the entrance passage.

In the top of the cage section 1, and in the bottom of the cage section 2 are formed coincident long narrow passageways 10 and 11, respectively. These passageways are adapted to be closed by means of sliding gates 12 and 13 mounted, respectively, in the sections 1 and 2. The ends of the gates are reduced and work through slots 14 and 15 formed, respectively, in the cage sections 1 and 2. The reduced ends of the gates 12 and 13 extend beyond the sides of the cage sections 1 and 2 and afford convenient finger pieces for moving the gates from their open to their closed positions, and vice versa. The top of the cage section 2 is made removable, is hinged at 16 and is adapted to be held in closed position by means of a hook and pin 17. Detachably mounted at the intermediate portion of the cage section 2 is a horizontally extended skeleton shelf 18, preferably constructed of marginal metallic strips and a body portion of woven wire screen in which are cut parallel passageways 19. The purpose of the shelf 18 is to hold food which will draw the flies.

When the device is in working order, the gates 12 and 13 will be opened to leave the passageways 10 and 11 free so that the flies may pass from the lower to the upper cage section where the food is placed. After a number of flies have entered the upper section of the cage, the gates 12 and 13 are closed and the upper section 2 removed from the lower section 1 by unfastening the hooks 3. The flies within the upper cage are then preferably destroyed by placing the cage section 2 in a pail of water. The plates 6 and brushes 9 together with the shelf 18 are made removable so that the trap may be easily cleansed.

What I claim is:

1. In a trap, the combination with a cage having an entrance passage, of a pair of brushes spaced one above the other and forming a continuation of said entrance passage, the free inner edges of said brushes being curved downwardly, spaced one slightly in advance of the other, substantially as described.

2. In a trap, the combination with a cage having an entrance passage, of upper and lower laterally spaced plates projecting through said entrance passage, the projecting ends being detachably seated in seats formed in the opposite sides of said passage, and coöperating brushes secured to the inner edges of said plates to prevent exit through said entrance passage, substantially as described.

In testimony whereof I affix my signature in presence of two witnesses.

HANS PASSIG.

Witnesses:
CHAS. E. LAVESSON,
M. J. HAUSEN.

Copies of this patent may be obtained for five cents each, by addressing the "Commissioner of Patents, Washington, D. C."